United States Patent [19]

Williams et al.

[11] 4,143,887

[45] Mar. 13, 1979

[54] INDEPENDENT REAR SUSPENSION SYSTEM

[75] Inventors: Alverson B. Williams, Sterling Heights; Alfred D. Bodnar, Pontiac, both of Mich.

[73] Assignee: General Motors Corporation, Detroit, Mich.

[21] Appl. No.: 863,053

[22] Filed: Dec. 21, 1977

[51] Int. Cl.² .................. B60G 3/06; B60G 11/64
[52] U.S. Cl. .................. 280/697; 180/73 R; 267/57; 280/700; 280/723
[58] Field of Search ............. 280/697, 700, 701, 690, 280/692, 695, 721, 723, 726, 661, 689, 668, 666; 180/73 R

[56] References Cited

U.S. PATENT DOCUMENTS

| | | | |
|---|---|---|---|
| 2,660,449 | 11/1953 | MacPherson | 280/665 |
| 2,739,658 | 3/1956 | Kolbe | 280/723 X |
| 2,961,253 | 11/1960 | Allison | 280/689 X |
| 3,379,269 | 4/1968 | Zetye | 180/73 R |
| 3,422,918 | 1/1969 | Musser | 180/73 R |
| 3,490,785 | 1/1970 | Moss | 280/668 |
| 3,575,441 | 4/1971 | Arning | 280/697 |
| 3,727,713 | 4/1973 | Van Winsen | 180/73 R |

OTHER PUBLICATIONS

Lancia Beta, 1974, Shop Manual, pp. 43 to 45.

Primary Examiner—John P. Silverstrim
Attorney, Agent, or Firm—Dean L. Ellis

[57] ABSTRACT

The drawings illustrate a rear suspension system for a motor vehicle, including a laterally extending member connected by vertically oriented pivotal means to a wheel carrier. A torsion bar is formed to include a transversely oriented center portion connected to the frame, and longitudinally oriented end portions connected at the distal ends thereof to the wheel carriers rearward of the pivotal connection between the wheel carrier, and the laterally extending member such that the distal ends of the torsion bar can move in the vertical direction only, thereby serving as both a stabilizer bar and a link for providing roll steer characteristics to the rear wheels. As an alternate embodiment, adjustable mounting means may be operatively connected between the distal ends of the torsion bar and the wheel carriers for providing toe-in or toe-out adjustment for the rear wheels.

6 Claims, 4 Drawing Figures

INDEPENDENT REAR SUSPENSION SYSTEM

The invention relates generally to a vertically oriented pivotal axis type rear suspension system, and, more particularly, to such systems wherein a torsion bar is utilized.

An object of the invention is to provide an improved rear suspension system including a torsion bar mounted between oppositely disposed wheel carriers and cooperable with laterally extending control arms for providing roll steer characteristics for the rear wheels.

Another object of the invention is to provide an independent rear suspension system for a motor vehicle including, a pair of laterally extending control arms having the inner ends thereof pivotally connected to the vehicle frame and the outer ends thereof pivotally connected to respective wheel carriers, a pair of telescoping strut dampers having the lower ends thereof rigidly connected to respective wheel carriers and the upper ends thereof connected to the vehicle body, a torsion bar having a transversely oriented center portion connected to the frame and longitudinally oriented end portions connected at the distal ends thereof to the wheel carriers rearward of the pivotal connection between the wheel carriers and the respective control arms such that the distal ends of the torsion bar can move in the vertical direction only, the torsion bar serving both as a stabilizer bar and as a link to provide roll steer characteristics for the rear wheels.

A further object of the invention is to provide the above described torsion bar arrangement on any rear suspension system having a vertically oriented pivotal axis arrangement for mounting the rear wheel thereof.

Still another object of the invention is to provide, as an alternate embodiment, the above described vertical or biased pivotal axis rear suspension system with eccentric mounting means operatively connected between the distal ends of the torsion bar and the wheel carriers for toe-in or toe-out adjustment of the rear wheels.

These and other objects and advantages will become more apparent when reference is made to the following description and accompanying drawings, wherein.

Figure 1:
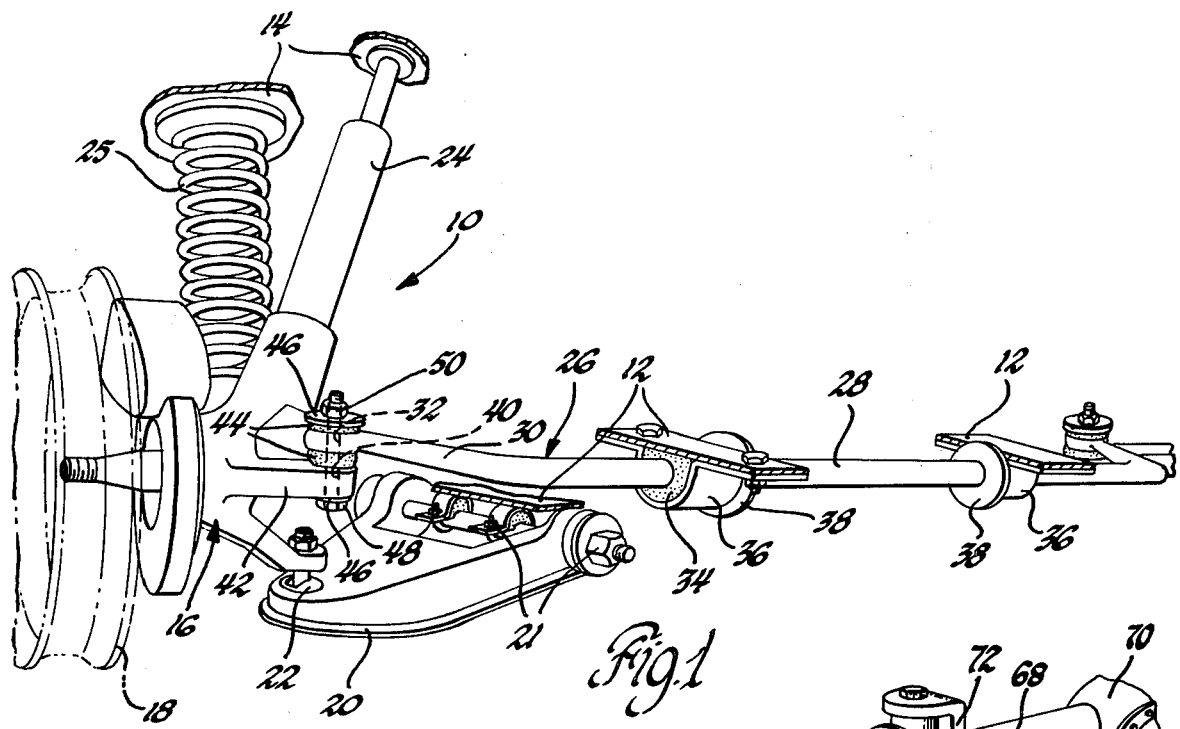
FIGS. 1 and 2 are fragmentary perspective views of rear suspension systems embodying the invention.

Referring now to the drawings in greater detail, FIG. 1 illustrates an independent rear suspension system 10 for a motor vehicle including a frame, represented at 12, supporting a body, represented at 14, and oppositely disposed wheel carriers 16 rotatably supporting rear wheels 18.

The suspension system 10 includes laterally extending control arms 20 of any conventional type, having the inner ends thereof pivotally connected by any suitable fastening means 21, to the frame 12 at opposite sides of the vehicle, and the outer ends thereof pivotally connected by ball joints 22 to respective wheel carriers 16. A pair of telescoping strut dampers or shock absorbers 24 are rigidly connected at the lower ends thereof to respective wheel carriers 16, and resiliently connected at the upper ends thereof to the body 14.

A coil spring 25 is mounted between the wheel carrier 16 and the body 14 adjacent the shock absorber 24. If desired, the coil spring may alternately be mounted (1) around the shock absorber 24, retained at the bottom end thereof on a retainer flange (not shown) formed on the shock absorber, or (2) adjacent the shock absorber 24, retained at the bottom end thereof on the control arm 20.

A torsion bar 26 is formed to include a transversely oriented center portion 28 and longitudinally oriented end portions 30, the latter terminating in connector openings 32. Spaced elastomeric bushings 34 are mounted around the center portion 28 adjacent oppositely disposed portions of the frame 12. Suitable clamps 36 are mounted around the bushings 34 and secured to the frame 12. A thrust washer 38 is secured to the center portion 28 of the torsion bar 26 adjacent the inner edge of each clamp 36 to retain the torsion bar in a fixed lateral position.

An opening 40 is formed through a generally longitudinally extending arm 42 of the wheel carrier 16, preferably extending in the rearward direction. Elastomeric or rubber washers 44 are mounted on opposite sides of the end of the longitudinal end portions 30 of the torsion bar 26, aligned with the connector opening 32. Metal washers 46 may be mounted on the upper rubber washer 44 and beneath the arm 42. Suitable fastener means, such as a bolt 48, extends through the lower washer 46, the opening 40 in the carrier arm 42, the lower rubber washer 46, the opening 32 in the torsion bar end, the upper rubber washer 44, and the upper metal washer 46, and is secured by a nut 50. By virtue of this connector arrangement, the distal ends of the torsion bar 26 are pivotable about the latter's elastomeric connections with the frame 12 in the vertical direction only, as seen in the side view, in response to jounce and rebound movements of the wheel 18 and its associated carrier 16, such as would occur when the wheel contacts a projection or a hole or enters into a turning condition.

Figure 4:
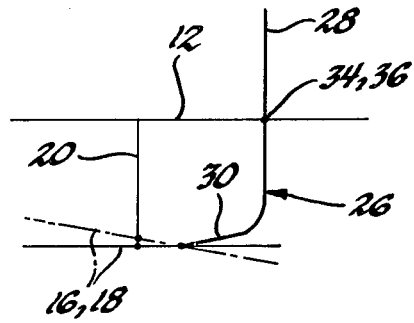
FIG. 4 is a schematic view representing an operational characteristic of the invention.
Figure 4:

It's apparent during such jounce and rebound of the wheel 18 that the control arm 20 is pivotable from a horizontal attitude, for example, about its inner frame-connected end, swinging an arc about the frame such that the effective lateral distance between the frame and the wheel is reduced, as seen in the plan view illustrated schematically in FIG. 4. Accordingly, since the longitudinal end portion 30 of the torsion bar 26 swings an arc in the vertical direction only about the connection 34, 36 with the frame 12, it may be noted in FIG. 4 that the wheel 18 will effectuate a turning or roll steer characteristic.

It's apparent that during a vehicular turning operation to the right, for example, the left wheel represented in FIG. 4 will go into jounce as the left side of the vehicle lowered, and the right wheel will go into rebound as the right side of the vehicle raises.

It should be apparent that the degree of the roll steer characteristics may be controlled by the selective initial geometric relationship between the locations of the ball joint end of the control arms 20 and the distal end of the torsion bar 26, and that the action could be reversed, should a particular vehicular application require it, by placing the torsion bar in front of the control arm instead of rearward thereof.

Figure 3:
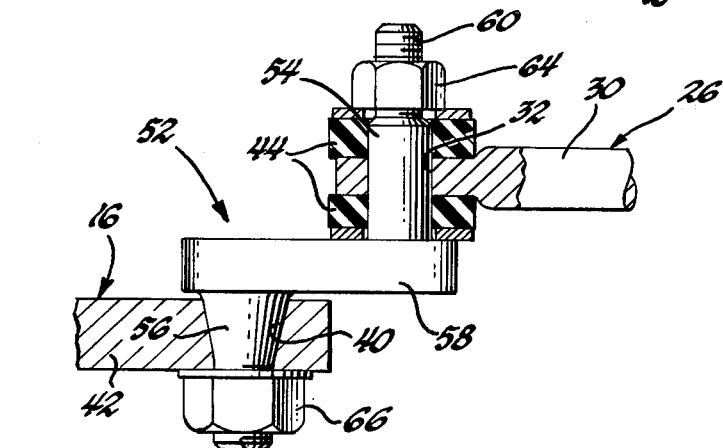
FIG. 3 is an enlarged fragmentary, side elevational view in partial cross section of an adjustment mechanism for the suspension system of FIG. 1.
Figure 3:

Referring now to FIG. 3, an eccentric fastener means 52 is shown as an alternate replacement for the bolt 48 of FIG. 1. As such, oppositely disposed mounting pins 54 and 56 are eccentrically formed on a center disc 58 for extensions through the connector opening 32 in the torsion bar end portion 30 and the opening 40 in the wheel carrier arm 42, respectively. The elastomeric washers 44 cooperate with the end portion 30 as in the FIG. 1 structure. It's apparent that toe-in of the wheels 18 may be controlled by selective rotational adjustment of the disc 58 prior to securing same in the selected position by nuts 64 and 66 on the respective threaded ends 60 and 62. Such rotational adjustment of the disc 58 pivots the axis of the pin 56 about the axis of the pin 54 and, hence, in turn, pivots the wheel carrier 16 vertically about the ball joint 22 to effectuate the desired toe-in of the wheel 18.

Figure 2:
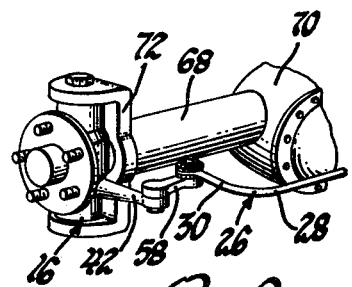

Referring next to FIG. 2, there is illustrated a solid axle housing 68 and a rear differential unit 70, including a vertically oriented mounting bracket 72 formed on the end of the solid axle housing 68. The wheel carrier 16 is pivotally connected at the upper and lower ends thereof to the mounting bracket 72, and the longitudinal end portion 30 of the torsion bar 26 is connected to the wheel carrier arm 42 via either the direct means shown in FIG. 1 or the eccentric means shown in FIG. 3. Leaf springs (not shown) would be used in lieu of the coil spring 25 of FIG. 1. As the vehicle undergoes a turning operation to the right, for example, the left wheel will go into jounce as the left side of the vehicle lowers, and the right wheel will go into rebound as the right side of the vehicle raises. Hence, the effective overall lateral length of the axle housing 68 will reduce relative to the overall length of the torsion bar 26 with the distal ends of the latter pivoting in opposite vertical directions, thereby causing both rear wheels to assume a right turn direction, aiding the vehicle in making an efficient turn.

It should be apparent that the invention provides a simplified, efficient rear suspension system for a motor vehicle, wherein the torsion bar serves as both a stabilizer bar and as a link member for retaining the vehicle wheel in a longitudinal rolling attitude while providing roll steer characteristics for same during turning operations.

It should be further apparent that the torsion bar 26 and the means for connecting it to the wheel carrier 16 are not limited in use on a strut type independent rear suspension system or on the ends of a rear solid axle arrangement, but, rather, can be used with any other vertically oriented pivotal axis arrangement, for example in conjunction with the lower control arm of an upper and lower, double "A" arm arrangement.

While but two embodiments of the invention have been shown and described, other modifications thereof are possible.

The embodiments of the invention in which an exclusive property or privilege is claimed are defined as follows:

1. An independent rear suspension system for a motor vehicle including a vehicle frame supporting a body and oppositely disposed wheel carriers rotatably supporting rear wheels, said suspension system comprising a pair of laterally extending control arms having the inner ends thereof pivotally connected to said frame and the outer ends thereof pivotally connected to respective wheel carriers, a pair of telescoping strut dampers having the lower ends thereof rigidly connected to respective wheel carriers and the upper ends thereof connected to said body, a torsion bar having a transversely oriented center portion and longitudinally oriented end portions, means connecting the transverse center portion of said torsion bar to said frame, and means connecting the distal ends of said torsion bar to said wheel carriers a predetermined distance away from the pivotal connection between the wheel carriers and the respective control arms as seen in the plan view, such that said distal ends of said torsion bar can move in the vertical direction only, said torsion bar serving as a stabilizer bar and as links cooperable with said wheel carriers to provide roll steer characteristics to said rear wheels.

2. An independent rear suspension system for a motor vehicle including a vehicle frame supporting a body and oppositely disposed wheel carriers rotatably supporting rear wheels, said suspension system comprising a pair of laterally extending control arms having the inner ends thereof pivotally connected to said frame and the outer ends thereof pivotally connected to respective wheel carriers, a pair of telescoping strut dampers having the lower ends thereof rigidly connected to respective wheel carriers and the upper ends thereof connected to said body, a torsion bar having a transversely oriented center portion and longitudinally oriented end portions, means connecting the transverse center portion of said torsion bar to said frame, and means connecting the distal ends of said torsion bar to said wheel carriers rearward of the pivotal connection between the wheel carriers and the respective control arms such that said distal ends of said torsion bar can move in the vertical direction only, said torsion bar serving both as a stabilizer bar and as a link to provide roll steer characteristics to said rear wheels.

3. An independent rear suspension system for a motor vehicle including a vehicle frame supporting a body and oppositely disposed wheel carriers rotatably supporting rear wheels, said suspension system comprising a pair of laterally extending control arms having the inner ends thereof pivotally connected to said frame and the outer ends thereof pivotally connected to respective wheel carriers, a pair of telescoping strut dampers having the lower ends thereof rigidly connected to respective wheel carriers and the upper ends thereof connected to said body, a torsion bar having a transversely oriented center portion and longitudinally oriented end portions, means connecting the transverse center portion of said torsion bar to said frame, eccentric mounting means operatively connected between distal ends of said torsion bar and said wheel carriers for toe-in adjustment of said rear wheels, and elastomeric means operatively connected to said eccentric mounting means a predetermined distance away from the pivotal connection between the wheel carriers and the respective control arms as seen in the plan view, such that said distal ends of said torsion bar can move in the vertical direction only, said torsion bar serving as a stabilizer bar and as links cooperable with said wheel carriers to provide roll steer characteristics to said rear wheels.

4. An independent rear suspension system for a motor vehicle including a vehicle frame supporting a body and oppositely disposed wheel carriers rotatably supporting rear wheels, said suspension system comprising a pair of laterally extending control arms having the inner ends thereof pivotally connected to said frame and the outer ends thereof pivotally connected to respective wheel carriers, a pair of telescoping strut dampers having the lower ends thereof rigidly connected to respective wheel carriers and the upper ends thereof connected to said body, a torsion bar having a transversely oriented center portion and longitudinally oriented end portions, elastomeric mounting means connecting the transverse center portion of said torsion bar to said frame, retention means operatively connected between said torsion bar and said frame for restraining said torsion bar from lateral movement, and eccentric elastomeric connector means connecting the distal ends of said torsion bar to said wheel carriers rearward of the pivotal connection between the wheel carriers and the respective control arms such that said distal ends of said torsion bar can move in the vertical direction only while providing for toe-in adjustment of said rear wheels, said torsion bar serving both as a stabilizer bar and as a link to provide roll steer characteristics to said rear wheels.

5. A rear suspension system for a motor vehicle including a vehicle frame supporting a body and oppositely disposed wheel carriers rotatably supporting rear wheels, said suspension system comprising a laterally extending member, connector means having a vertically oriented pivotal axis for pivotally connecting said laterally extending member to a wheel carrier, a torsion bar having a transversely oriented center portion and longitudinally oriented end portions, means connecting the transverse center portion of said torsion bar to said frame, and means connecting the distal ends of said torsion bar to said wheel carriers a predetermined distance away from the pivotal connection between each wheel carrier and said laterally extending member, as seen in the plan view, such that said distal ends of said torsion bar can move in the vertical direction only, said torsion bar serving as a stabilizer bar and as links cooperable with said wheel carriers to provide roll steer characteristics to said rear wheels.

6. A rear suspension system for a motor vehicle including a vehicle frame supporting a body and oppositely disposed wheel carriers rotatably supporting rear wheels, said suspension system comprising a laterally extending solid axle housing, a mounting bracket having vertically aligned, spaced connector means formed on each end of said solid axle housing, said connector means being pivotally connected to respective uppe and lower ends of each of said wheel carriers, a torsion bar having a transversely oriented center portion and longitudinally oriented end portions, elastomeric mounting means connecting the transverse center portion of said torsion bar to said frame, retention means operatively connected between said torsion bar and said frame for retaining said torsion bar from lateral movement, and elastomeric mounting means connecting the distal ends of said torsion bar to said wheel carriers rearward of the axis of the pivotal connection between the wheel carriers and the respective mounting brackets such that said distal ends of said torsion bar can move in the vertical direction only, said torsion bar serving both as a stabilizer bar and as a link to provide roll steer characteristics to said rear wheels.

* * * * *